(12) United States Patent
Choi et al.

(10) Patent No.: US 11,705,549 B2
(45) Date of Patent: Jul. 18, 2023

(54) TRANSPARENT ANODE THIN FILM COMPRISING A TRANSPARENT ANODE ACTIVE MATERIAL, LITHIUM THIN FILM SECONDARY BATTERY, AND THE METHOD FOR MANUFACTURING THE SAME

(71) Applicant: KOREA INSTITUTE OF SCIENCE AND TECHNOLOGY, Seoul (KR)

(72) Inventors: Ji-Won Choi, Seoul (KR); Jin Sang Kim, Seoul (KR); Chong Yun Kang, Seoul (KR); Seung Hyub Baek, Seoul (KR); Seong Keun Kim, Seoul (KR); Hyun-Cheol Song, Seoul (KR); Sang Tae Kim, Seoul (KR); Hyun Seok Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 243 days.

(21) Appl. No.: 16/952,087

(22) Filed: Nov. 19, 2020

(65) Prior Publication Data
US 2021/0167352 A1    Jun. 3, 2021

(30) Foreign Application Priority Data
Nov. 28, 2019    (KR) .................. 10-2019-0155785

(51) Int. Cl.
*H01M 4/04*    (2006.01)
*H01M 10/052*    (2010.01)
(Continued)

(52) U.S. Cl.
CPC .......... *H01M 4/0404* (2013.01); *H01M 4/58* (2013.01); *H01M 10/052* (2013.01); *H01M 2004/021* (2013.01); *H01M 2004/027* (2013.01)

(58) Field of Classification Search
CPC .... H01M 4/134; H01M 4/1395; H01M 4/386; H01M 10/052; H01M 2004/027
See application file for complete search history.

(56) References Cited

U.S. PATENT DOCUMENTS

| 4,978,437 A | 12/1990 | Wirz |
| 5,202,201 A * | 4/1993 | Meunier ............. H01M 10/052 |
| | | 204/192.15 |

(Continued)

FOREIGN PATENT DOCUMENTS

| EP | 2600459 A1 | 6/2013 |
| KR | 100721648 B1 | 5/2007 |

(Continued)

OTHER PUBLICATIONS

M K Mustafa et al., "Effect on Silicon Nitride thin Films Properties at Various Powers of RF Magnetron Sputtering," International Journal of Engineering & Technology, 2018, pp. 39-41, vol. 7, No. 4.30.

(Continued)

*Primary Examiner* — Ula C Ruddock
*Assistant Examiner* — Scott J Chmielecki
(74) *Attorney, Agent, or Firm* — Cantor Colburn LLP

(57) ABSTRACT

Disclosed is a transparent anode thin film comprising a transparent anode active material layer, wherein the transparent anode active material layer comprises a Si-based anode active material having a composition represented by the following [Chemical Formula 1]:

$SiN_x$     [Chemical Formula 1]

(wherein $0<x\leq1.5$).

14 Claims, 15 Drawing Sheets

(51) Int. Cl.
   *H01M 4/58*    (2010.01)
   *H01M 4/02*    (2006.01)

(56) References Cited

U.S. PATENT DOCUMENTS

2006/0292445 A1* 12/2006 Kogetsu ............. H01M 4/0421
                                                423/406
2015/0201837 A1*  7/2015 Song ................... A61B 5/1486
                                                340/870.07
2019/0109295 A1*  4/2019 Tang ..................... H10K 50/11
2019/0207128 A1*  7/2019 Brooks ................. H10K 50/11

FOREIGN PATENT DOCUMENTS

KR           101167817 B1    7/2012
KR     10-2016-0119596 A    10/2016
KR           101997665 B1   10/2019

OTHER PUBLICATIONS

A. Ulvestad et al., "Silicon nitride as anode material for Li-ion batteries: Understanding the SiNx conversion reaction," Journal of Power Sources, 2018, pp. 414-421, vol. 399.

Joo Han Kim et al., "Microstructure and properties of silicon nitride thin films deposited by reactive bias magnetron sputtering," Journal of Applied Physics, Jun. 1998, pp. 5831-5839, vol. 83, No. 11.

Jinho Yang et al., "Plasma enhanced chemical vapor deposition silicon nitride for a high-performance lithium ion battery anode," Journal of Power Sources, 2014, pp. 520-525, vol. 269, Elsevier B.V.

\* cited by examiner

TRANSPARENT ANODE THIN FILM COMPRISING A TRANSPARENT ANODE ACTIVE MATERIAL, LITHIUM THIN FILM SECONDARY BATTERY, AND THE METHOD FOR MANUFACTURING THE SAME

CROSS-REFERENCE TO RELATED APPLICATION

This application claims priority to Korean Patent Application No. 10-2019-0155785, filed on Nov. 28, 2019, and all the benefits accruing therefrom under 35 U.S.C. § 119, the contents of which in its entirety are herein incorporated by reference.

BACKGROUND

1. Field

The present disclosure relates to a transparent anode thin film comprising a transparent anode active material layer, a lithium thin film secondary battery comprising the same, and a method for manufacturing the same.

2. Description of the Related Art

Recently, active studies have been conducted about transparent devices. Therefore, studies about transparent batteries have been reported frequently during the last ten-year period. However, merely studies about manufacture of a transparent battery using a grid-like electrode pattern with a fine line width lower than the resolution of human eyes have been reported and there has been no report about a battery totally including transparent constitutional elements. Therefore, it is required to conduct studies about a battery totally including transparent constitutional elements. Particularly, in the case of a cathode material, there has been a report about a cathode material using an olivine-based material having a broad band-gap energy and showing a high transmittance.

However, in the case of an anode material, there has been no study result about a transparent anode material. Therefore, it is required to study a transparent anode material in order to develop a battery totally including transparent materials. Since $Si_3N_4$ has a significantly high band-gap energy, it may be a good candidate as a transparent battery anode material. However, $Si_3N_4$ has electrical properties as a non-conductor, and thus has a significantly low discharge capacity. Therefore, there is a need for a study about disclosure of an optimized composition by varying the ratio of nitrogen to silicon. Recently, some studies about an anode material of $SiN_x$ have been reported frequently as one of the methods for improving stability of Si. However, in such studies, a deposition temperature of 400° C. or higher is required and plasma-enhanced chemical vapor deposition (PECVD) is used. Therefore, it is difficult to apply such studies to thin film secondary batteries including multi-layer thin films. In the case of a thin film secondary battery, LiPON has been used frequently as a solid electrolyte but deposition of $SiN_x$ at 400° C. causes a serious problem of degradation of the ion conductivity of the electrolyte.

SUMMARY

The present disclosure is directed to providing a Si-based anode active material having an optimized composition in order to solve the problem of a significantly low discharge capacity of $Si_3N_4$ as a transparent anode material, caused by its electrical properties as a non-conductor.

The present disclosure is directed to solving the problem of degradation of ion conductivity of an electrolyte caused by a conventional method for preparing a $SiN_x$ anode material requiring a deposition temperature of 400° C. or higher. Therefore, the present disclosure is also directed to providing a transparent anode thin film having a $SiN_x$ anode active material composition capable of deposition and having a high transmittance.

In one aspect, there is provided a transparent anode thin film comprising a transparent anode active material layer, wherein the transparent anode active material layer comprises a Si-based anode active material having a composition represented by the following [Chemical Formula 1]:

$SiN_x$         [Chemical Formula 1]

(wherein 0<x≤1.5).

In an exemplary embodiment, x may be 0<x≤1.0.
In an exemplary embodiment, x may be 0.6≤x≤0.9.
In an exemplary embodiment, the transparent anode active material layer may have a thickness of 0.1-2 μm.
In an exemplary embodiment, the transparent anode thin film may have a transmittance of 80% or more in a wavelength region of 550 nm.

In another aspect, there is provided a lithium thin film secondary battery comprising the transparent anode thin film.

In still another aspect, there is provided a method for manufacturing a transparent anode thin film comprising carrying out deposition of a transparent anode active material layer, wherein the transparent anode active material layer comprises a Si-based anode active material having a composition represented by the following [Chemical Formula 1]:

$SiN_x$         [Chemical Formula 1]

(wherein 0<x≤1.5).

In an exemplary embodiment, the deposition may be deposition of a Si target under gaseous atmosphere.
In an exemplary embodiment, the gaseous atmosphere may comprise at least one of Ar and $N_2$.
In an exemplary embodiment, the gaseous atmosphere may be $N_2$/Ar atmosphere which may have a ratio of $N_2$/Ar of 0.1-0.5%.
In an exemplary embodiment, the deposition may be carried out by at least one selected from sputtering, pulse laser deposition (PLD) and plasma-enhanced chemical vapor deposition (PECVD).
In an exemplary embodiment, the deposition may be carried out under a pressure of 1-30 mtorr.
In an exemplary embodiment, the deposition may be carried out under a pressure of 1-10 mtorr.
In an exemplary embodiment, the deposition may be carried out with a deposition power of 0.1-2.0 $W/cm^2$.

The transparent anode thin film according to an embodiment of the present disclosure uses a Si-based anode active material having a specific composition, and thus may have excellent electrical properties and optical properties.

Particularly, it is possible to obtain a longer cycle life than the cycle life of a conventional anode material using Si and to obtain a higher discharge capacity than the discharge capacity of an anode material using a carbonaceous material. In addition, it is possible to realize a transparent battery, when using the transparent anode thin film having a high transmittance as an anode material for a transparent thin film secondary battery.

DETAILED DESCRIPTION

Figure 1A:
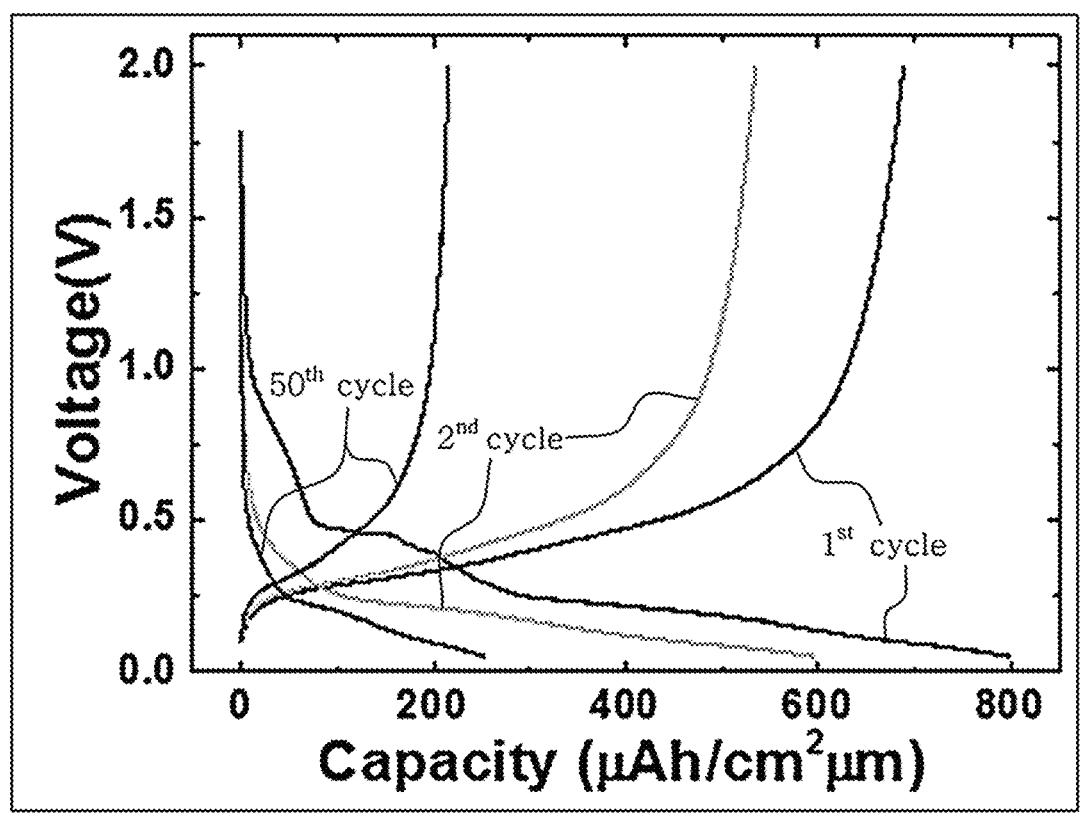
FIG. 1A is a graph illustrating the charge/discharge test result of a Si thin film deposited under Ar atmosphere as a transparent anode thin film according to an embodiment of the present disclosure.

Exemplary embodiments now will be described more fully hereinafter.

The embodiments described hereinafter are for illustrative purposes only and may be embodied in many different forms, and thus the scope of the present disclosure is not limited thereto.

Various changes and modifications of the present disclosure may be made. Therefore, it should be understood that the following exemplary embodiments are not intended to limit the scope of the present disclosure but cover any modifications, equivalents and substitutions without departing from the spirit and scope of the present disclosure.

Transparent Anode Thin Film

In order to solve the above-mentioned problems, the present inventors have found that a transparent anode thin film comprising a transparent anode active material layer which comprises an anode active material having a specific composition has excellent electrical properties and optical properties, and the present disclosure is based on this finding.

In one aspect of the present disclosure, there is provided a transparent anode thin film including a transparent anode active material layer which comprises a Si-based anode active material having a composition represented by the following [Chemical Formula 1]:

$$SiN_x \qquad \text{[Chemical Formula 1]}$$

(wherein $0 < x \leq 1.5$).

According to an embodiment, the transparent anode active material layer may have a specific composition represented by [Chemical Formula 1], and may have excellent electrical and optical properties, even when it is deposited with a specific range of composition at room temperature. Meanwhile, when x is larger than 1.5 in the composition represented by [Chemical Formula 1], such a high ratio of nitrogen may cause an increase in over-voltage and significantly low electrical conductivity.

Specifically, in the composition represented by [Chemical Formula 1], x may be $0 < x \leq 1.0$, preferably $0.6 \leq x \leq 0.9$. When x is larger than 1.0, the electrical conductivity may be reduced so that it may hardly function as an anode active material. Particularly, when $0.6 \leq x \leq 0.9$, the composition may retain cycle stability and may have electrical conductivity with which it may be used as an anode active material.

According to an embodiment, the transparent anode active material layer may have a thickness of 0.1-2 μm. When the transparent anode active material layer has a thickness of less than 0.1 μm, battery capacity is too low to drive devices. When the transparent anode active material has a thickness of larger than 2 μm, transmittance is reduced significantly so that it may not be used as a transparent anode material.

According to an embodiment, the transparent anode thin film may have a transmittance of 80% or more in a wavelength region of 550 nm. Specifically, the transparent anode thin film may have a transmittance of 85% or more, or 90% or more.

In another aspect of the present disclosure, there is provided a lithium thin film secondary battery comprising the transparent anode thin film.

Method for Manufacturing Transparent Anode Thin Film

In another aspect of the present disclosure, there is provided a method for manufacturing a transparent anode thin film comprising carrying out deposition of a transparent anode active material layer, wherein the transparent anode active material layer comprises a Si-based anode active material having a composition represented by the following [Chemical Formula 1]:

$$SiN_x \qquad \text{[Chemical Formula 1]}$$

(wherein $0 < x \leq 1.5$).

Meanwhile, unlike deposition of a $SiN_x$ anode material at a high temperature of about 400° C. or higher according to the related art, the anode active material layer having a specific composition represented by [Chemical Formula 1]

may be deposited at room temperature according to an embodiment of the present disclosure.

First, a transparent anode active material layer may be deposited. Specifically, a transparent anode active material layer may be deposited on a substrate, wherein the substrate may be a substrate used conventionally in the art.

For example, since the substrate allows deposition at room temperature, it is possible to carry out uniform deposition not only on a glass substrate and a rigid substrate including polyethylene, polyester, etc. but also on a flexible plastic substrate including a polymer, such as polyethylene terephthalate (PET) or polycarbonate (PC), susceptible to heat and deformable with ease at a temperature of 150° C. or higher. For example, the substrate may comprise at least one polymer selected from polyethylene terephthalate, polyether sulfone and polycarbonate.

According to an embodiment, the deposition may be carried out by depositing a Si target under gaseous atmosphere. For example, the deposition may be carried out under gaseous atmosphere, such as nitrogen gas. In addition, it is possible to control the optical properties and/or electrical properties of the transparent anode thin film by adjusting the added amount of nitrogen gas.

According to an embodiment, the gaseous atmosphere may comprise at least one of Ar and $N_2$.

According to another embodiment, the gaseous atmosphere may be $N_2$/Ar atmosphere which may have a ratio of $N_2$/Ar of 0.1-0.5%. Herein, the ratio of $N_2$/Ar means a mixing ratio based on the mass law. When the ratio of $N_2$/Ar is less than 0.1%, the anode active material may have an excessively low nitrogen proportion. When the ratio of $N_2$/Ar is larger than 0.5%, electrical conductivity may be reduced excessively so that it may not function as an anode active material.

According to still another embodiment, the deposition may be carried out by at least one selected from sputtering, pulse laser deposition (PLD) and plasma-enhanced chemical vapor deposition (PECVD), but is not limited thereto.

Preferably, the deposition may be carried out by reactive sputtering. According to the related art of $SiN_x$ thin film formation, there is known a method for manufacturing a stable $SiN_x$ thin film having high capacity by carrying out deposition at a temperature of 100-400° C. through PECVD. However, the method essentially requires a high-temperature process, resulting in a problem of degradation of the ion conductivity of an electrolyte, when using a solid electrolyte, such as LiPON electrolyte. However, in the case of the method for manufacturing a transparent anode thin film according to an embodiment of the present disclosure, the method uses a sputtering process to facilitate a stacking process and allows deposition at room temperature advantageously, and thus provides high stability, high transmittance and high capacity characteristics.

According to still another embodiment, the deposition may be carried out under a pressure of 1-30 mtorr, preferably under a pressure of 1-10 mtorr. When the deposition is carried out under a pressure of less than 1 mtorr, the anode active material may have an excessively low nitrogen proportion. When the deposition is carried out under a pressure of larger than 30 mtorr, electrical conductivity may be reduced excessively so that it may not function as an anode active material.

According to still another embodiment, the deposition may be carried out with a deposition power of 0.1-2.0 W/cm². When the deposition is carried out with a deposition power of less than 0.1 W/cm², the anode active material may have an excessively low nitrogen proportion. When the deposition is carried out with a deposition power of larger than 2.0 W/cm², electrical conductivity may be reduced excessively so that it may not function as an anode active material.

EXAMPLES

Hereinafter, the present disclosure will be explained in more detail with reference to Examples. However, the following Examples are provided so that the present disclosure will be understood easily by those skilled in the art and it is apparent to those skilled in the art that the scope of the present disclosure is not limited thereto.

Examples 1-4

$SiN_x$ thin films were deposited on a Cu/glass substrate at room temperature through a reactive sputtering process. The $SiN_x$ thin films were deposited by using a Si target with a power of 1 W/cm² under a working pressure of 5 mtorr and a base pressure of $9.0 \times 10^{-7}$ torr, and each $SiN_x$ thin film was deposited under pure Ar gaseous atmosphere (Example 1), 0.1% $N_2$/Ar gaseous atmosphere (Example 2), 0.3% $N_2$/Ar gaseous atmosphere (Example 3) and 0.5% $N_2$/Ar gaseous atmosphere (Example 4).

Test Example 1

Determination of Charge/Discharge Characteristics Depending on Gaseous Atmosphere FIG. 1A to FIG. 1D illustrate the results of charge/discharge of the samples deposited under various types of gaseous atmosphere. Herein, the results are obtained within a voltage range of 0.05-2V.

FIG. 1A illustrates the charge/discharge test result of the Si thin film deposited under pure Ar atmosphere according to Example 1. At the first cycle, the Si thin film shows a discharge capacity of 688.5 μAh/cm²·μm, which corresponds to 75.2% based on the theoretical capacity, 915 μAh/cm²·μm. Voltage plateaus generated by the formation of Si—Li alloy appear at 0.5V and 0.2V. In this case, coulombic efficiency is 86.2%. In the case of the thin film deposited under pure Ar atmosphere, a rapid decrease in capacity appears after 50 charge/discharge cycles. A discharge capacity corresponding to 31.3% of the initial capacity is determined.

Figure 1B:
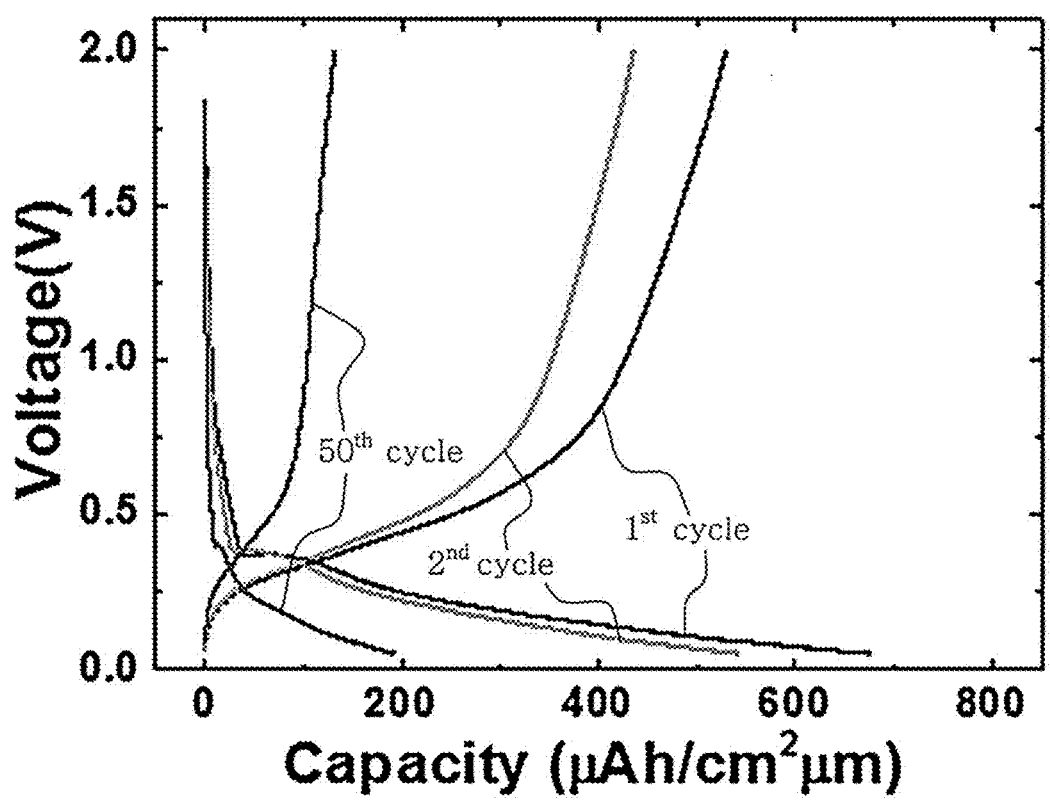
FIG. 1B is a graph illustrating the charge/discharge test result of a $SiN_x$ thin film deposited under 0.1% $N_2$/Ar atmosphere as a transparent anode thin film according to an embodiment of the present disclosure.

FIG. 1B illustrates the charge/discharge test result of the thin film deposited under 0.1% $N_2$/Ar atmosphere according to Example 2. The initial discharge capacity is 529.1 μAh/cm²·μm. In this case, coulombic efficiency is 78.3%. After 50 charge/discharge cycles, a discharge capacity corresponding to 24.8% of the initial capacity is determined. Like the Si thin film deposited under pure Ar atmosphere, a significant decrease in discharge capacity appears. However, voltage plateaus appear at 0.38V and 0.18V. In addition, a voltage drop is observed due to an over-voltage caused by a conversion reaction at 0.37V.

FIG. 10 illustrates the charge/discharge test result of the thin film deposited under 0.3% $N_2$/Ar atmosphere according to Example 3. The graph in FIG. 10 shows a shape significantly different from FIG. 1A. While the thin film deposited under pure Ar shows a linear plateau, the thin film deposited under 0.3% $N_2$/Ar atmosphere shows a curved plateau. In addition, like the thin film deposited under 0.1% $N_2$/Ar atmosphere, a voltage drop is observed due to an over-voltage. The initial discharge capacity is 172.6 μAh/cm²·μm.

In this case, coulombic efficiency is 60.0%. It is shown that the thin film has a capacity corresponding to 25% based on the capacity of the thin film deposited under pure Ar atmosphere. However, even after 50 cycles, the thin film shows a capacity retention of 73.8%. The thin film shows a coulombic efficiency of 85%, which suggests relatively stable electrochemical properties.

Figure 1C:
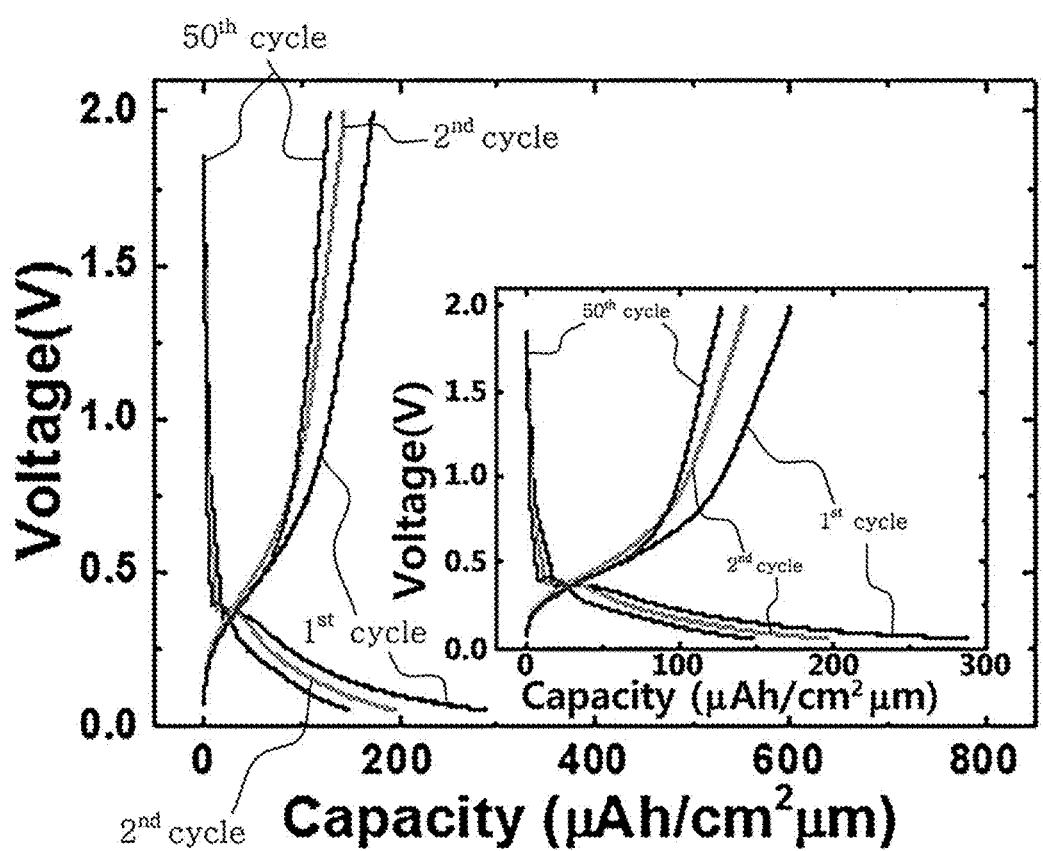
FIG. 1O is a graph illustrating the charge/discharge test result of a $SiN_x$ thin film deposited under 0.3% $N_2$/Ar atmosphere as a transparent anode thin film according to an embodiment of the present disclosure.
FIG. 1D is a graph illustrating the charge/discharge test result of a $SiN_x$ thin film deposited under 0.5% $N_2$/Ar atmosphere as a transparent anode thin film according to an embodiment of the present disclosure.
Figure 1D:
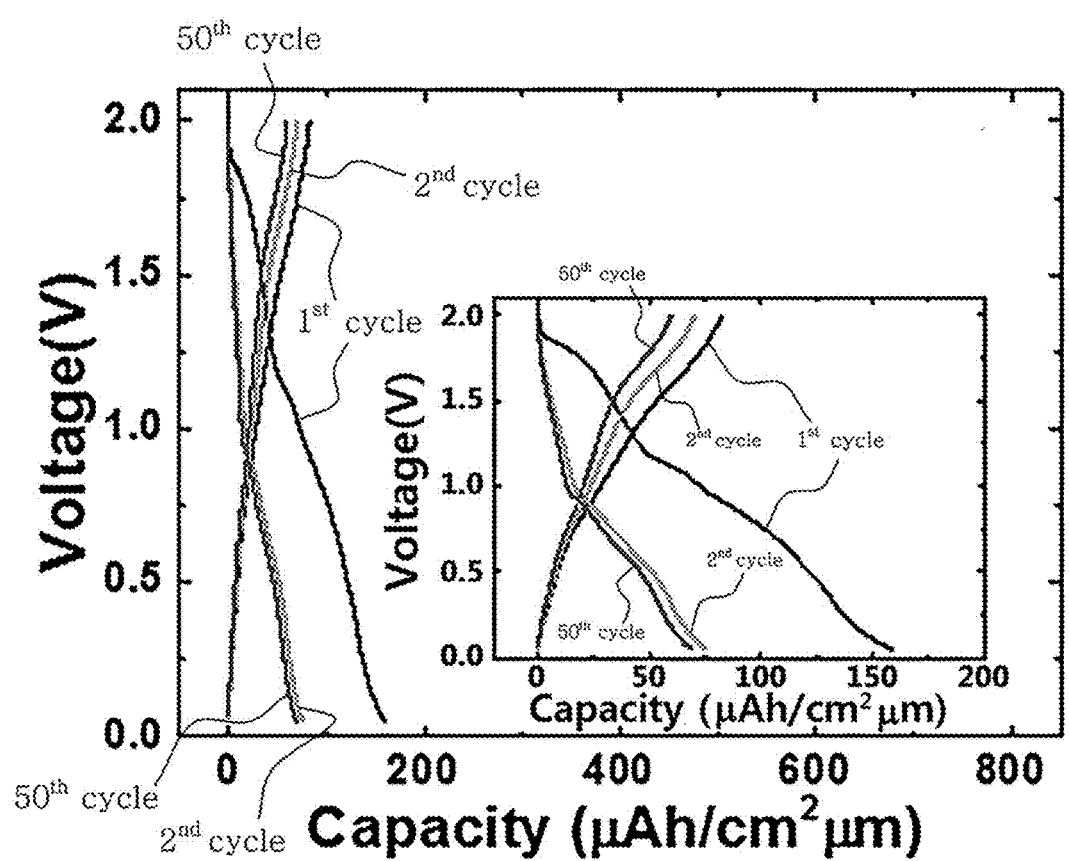

FIG. 1D illustrates the charge/discharge test result of the thin film deposited under 0.5% $N_2$/Ar atmosphere according to Example 4. It is determined that the thin film has a significantly low initial discharge capacity. In addition, no plateau is observed. This is because such an increased nitrogen proportion causes an increase in over-voltage and low electrical conductivity, and thus the test reaches the cut-off voltage before conversion.

After carrying out the test with different gas ratios of atmosphere, the $SiN_x$ thin film deposited under 0.3% $N_2$/Ar atmosphere showed relatively higher electrochemical properties. Therefore, the gas ratio was fixed at 0.3% $N_2$/Ar. $SiN_x$ thin films were deposited with 1 W/cm$^2$ under the conditions of 0.3% $N_2$/Ar and a base pressure of $9.0 \times 10^{-7}$ torr. Deposition was carried out under a different working pressure of 5 mtorr, 10 mtorr or 20 mtorr.

Examples 5 and 6

$SiN_x$ thin films were deposited on a Cu/glass substrate at room temperature through a reactive sputtering process. The $SiN_x$ thin films were deposited by using a Si target with a power of 1 W/cm$^2$ under the conditions of 0.3% $N_2$/Ar gaseous atmosphere and a base pressure of $9.0 \times 10^{-7}$ torr, and each $SiN_x$ thin film was deposited under a working pressure of 5 mtorr (Example 3), 10 mtorr (Example 5) and 20 mtorr (Example 6).

Test Example 2

Determination of Charge/Discharge Characteristics Depending on Working Pressure

Figure 2A:
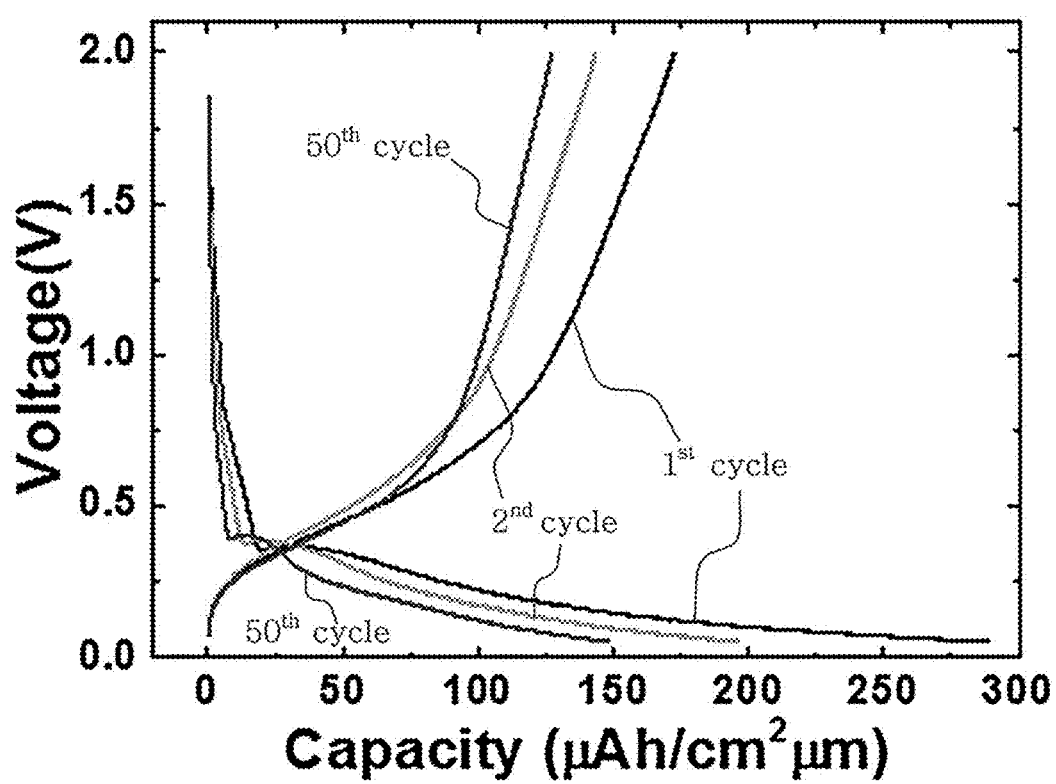
FIG. 2A is a graph illustrating the charge/discharge test result of a $SiN_x$ thin film deposited under a working pressure of 5 mtorr as a transparent anode thin film according to an embodiment of the present disclosure.
Figure 2B:
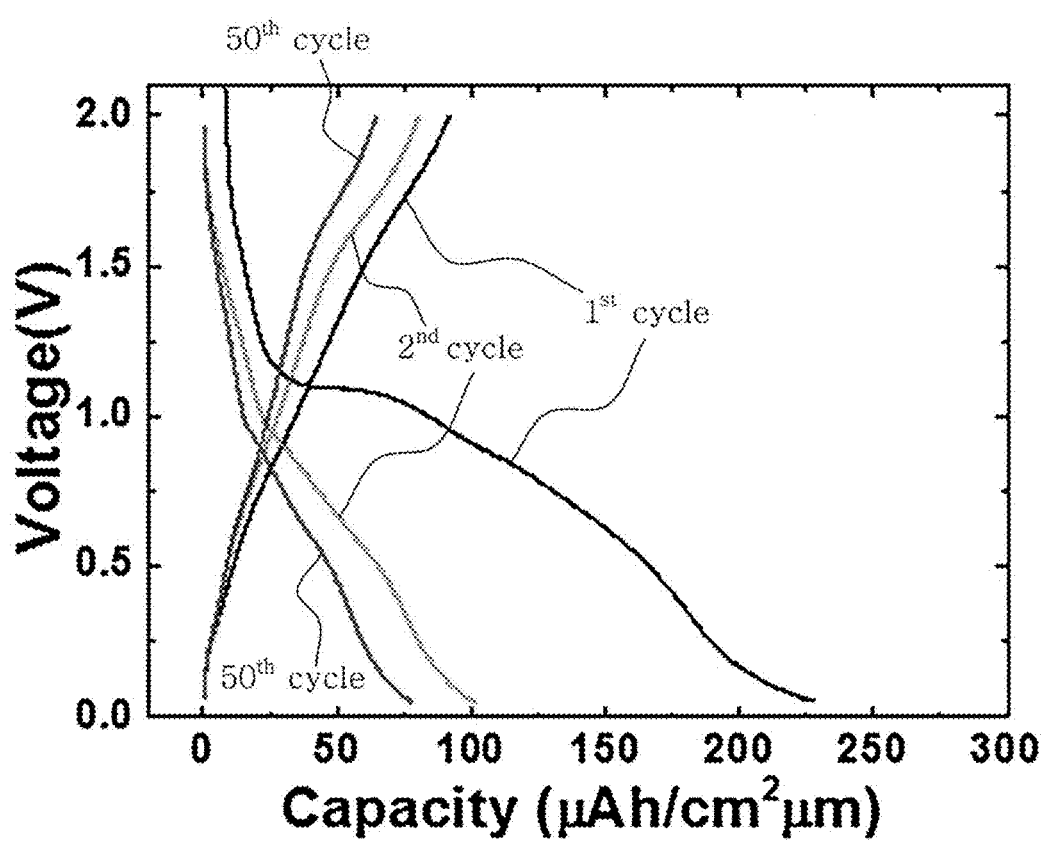
FIG. 2B is a graph illustrating the charge/discharge test result of a $SiN_x$ thin film deposited under a working pressure of 10 mtorr as a transparent anode thin film according to an embodiment of the present disclosure.
Figure 2C:
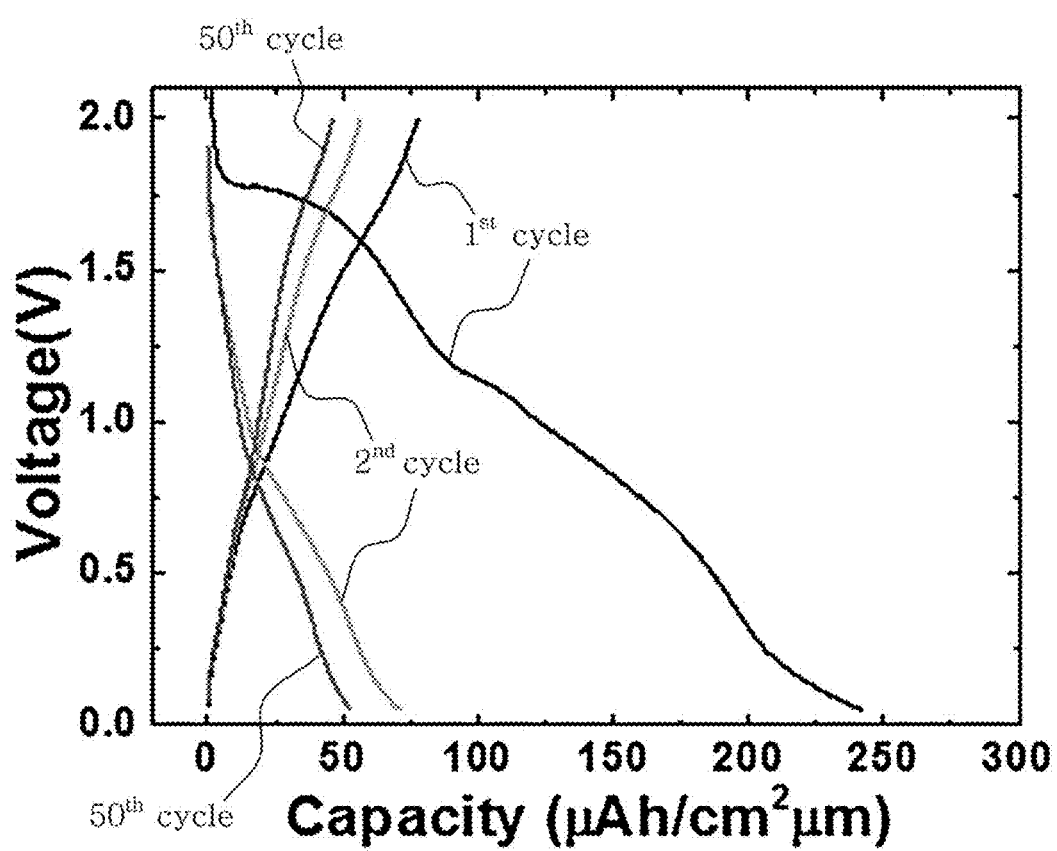
FIG. 2C is a graph illustrating the charge/discharge test result of a $SiN_x$ thin film deposited under a working pressure of 20 mtorr as a transparent anode thin film according to an embodiment of the present disclosure.

FIG. 2A illustrates the result of Example 3 using the same sample as used in FIG. 1C. FIG. 2B illustrates the result of the thin film deposited under 10 mtorr. Herein, it is shown that the capacity is decreased as the working pressure is increased. In addition, FIG. 2C illustrates the result of the thin film deposited under 20 mtorr. Herein, in the case of Example 5 (10 mtorr) and Example 6 (20 mtorr), the capacity is decreased and no plateau is observed. Therefore, the working pressure was fixed at 5 mtorr.

Examples 7-9

$SiN_x$ thin films were deposited on a Cu/glass substrate at room temperature through a reactive sputtering process. The $SiN_x$ thin films were deposited by using a Si target under the conditions of 0.3% $N_2$/Ar gaseous atmosphere, a working pressure of 5 mtorr and a base pressure of $9.0 \times 10^{-7}$ torr, and each $SiN_x$ thin film was deposited with a power of 0.5 W/cm$^2$ (Example 7), 0.75 W/cm$^2$ (Example 8), 1 W/cm$^2$ (Example 3) and 1.25 W/cm$^2$ (Example 9).

Test Example 3

Determination of Charge/Discharge Characteristics Depending on Deposition Power

Figure 3A:
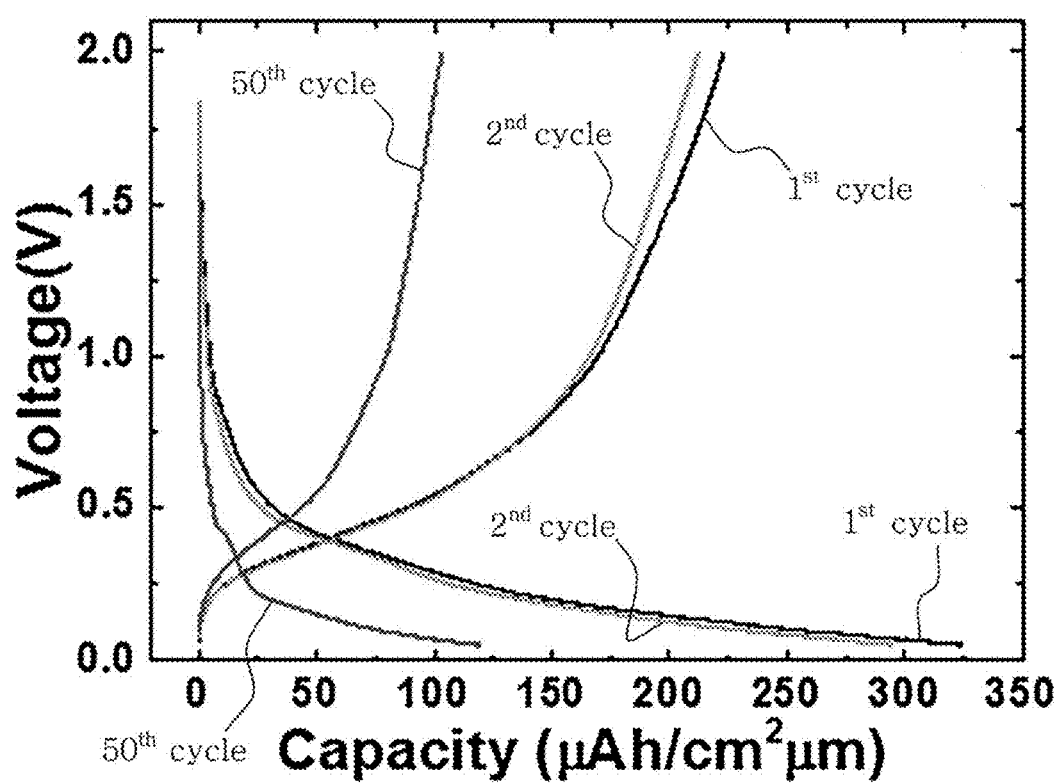
FIG. 3A is a graph illustrating the charge/discharge test result of a $SiN_x$ thin film deposited with a deposition power of 1.25 W/cm² as a transparent anode thin film according to an embodiment of the present disclosure.

FIG. 3A illustrates the charge/discharge test result of the $SiN_x$ thin film deposited with a power of 1.25 W/cm$^2$ according to Example 9. The initial discharge capacity is 223.2 $\mu$Ah/cm$^2 \cdot \mu$m, and thus a relatively high capacity is realized. However, after 50 cycles, the thin film shows a capacity corresponding to merely 46.2% of the initial capacity.

Figure 3B:
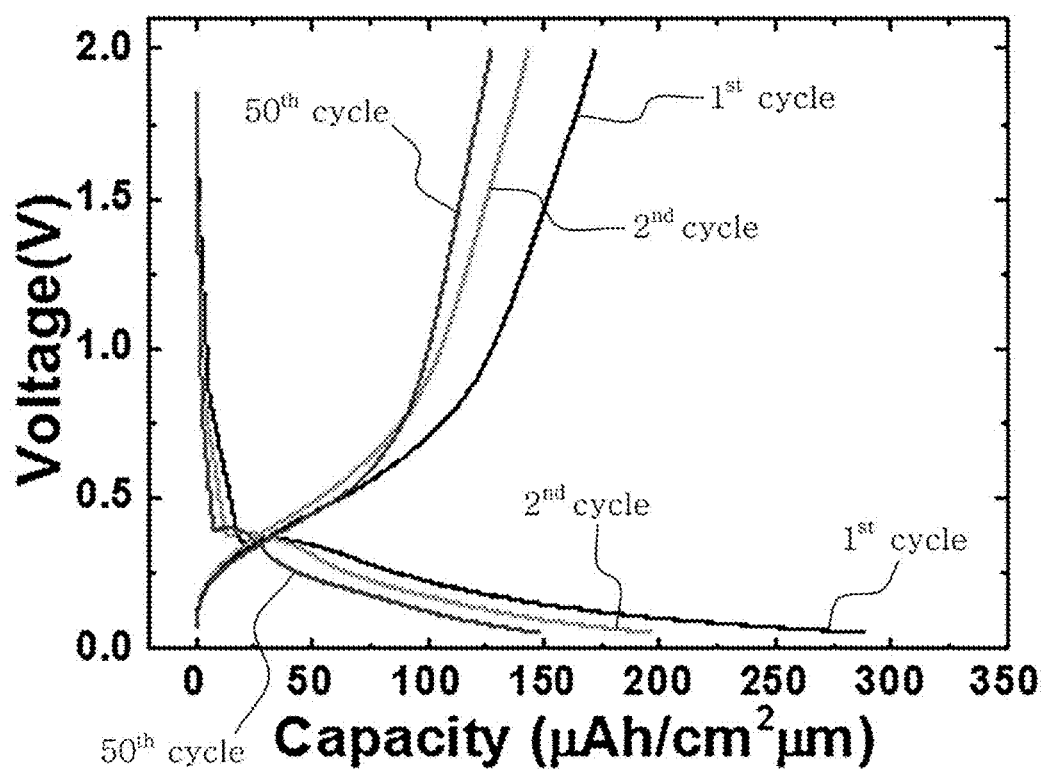
FIG. 3B is a graph illustrating the charge/discharge test result of a $SiN_x$ thin film deposited with a deposition power of 1 W/cm² as a transparent anode thin film according to an embodiment of the present disclosure.

FIG. 3B illustrates the charge/discharge test result of the $SiN_x$ thin film deposited with a power of 1 W/cm$^2$ according to Example 3. FIG. 3B shows the result of the same sample as used in FIG. 1C and FIG. 2A. It can be seen that Example 3 (1 W/cm$^2$ power) shows a lower capacity as compared to Example 9 (1.25 W/cm$^2$ power). However, after 50 cycles, the thin film shows a discharge capacity corresponding to 73.8% based on the initial capacity, and thus has a higher capacity retention as compared to Example 9.

Figure 3C:
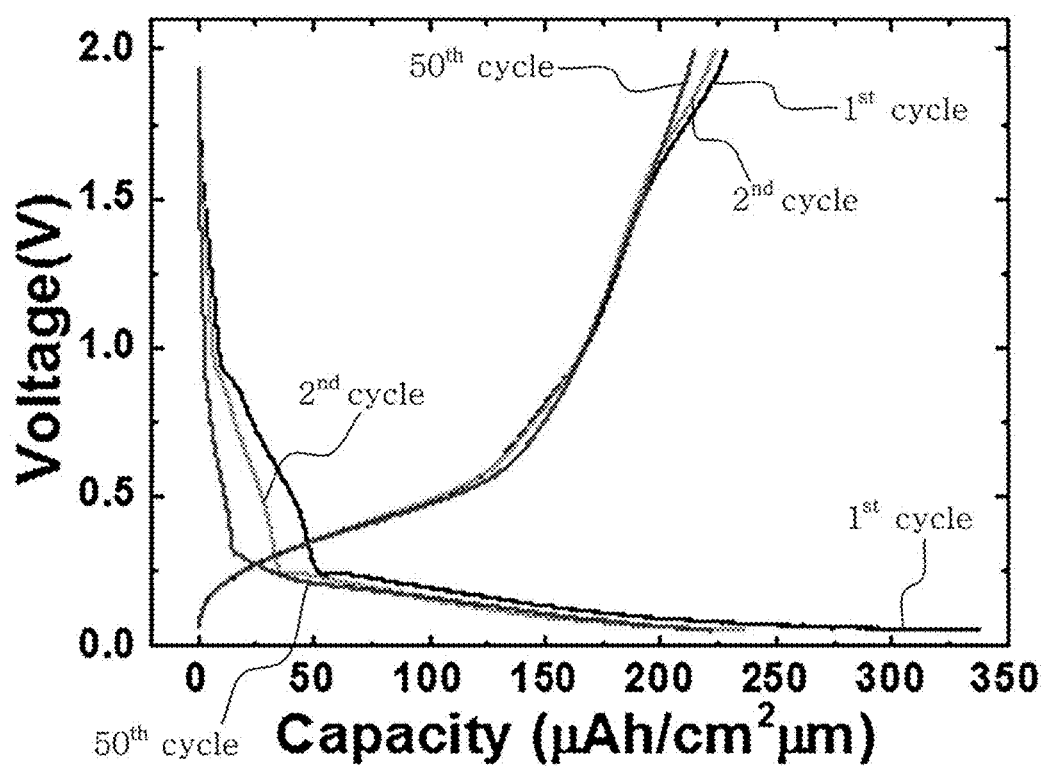
FIG. 3C is a graph illustrating the charge/discharge test result of a $SiN_x$ thin film deposited with a deposition power of 0.75 W/cm² as a transparent anode thin film according to an embodiment of the present disclosure.

FIG. 3C illustrates the charge/discharge test result of the $SiN_x$ thin film deposited with a power of 0.75 W/cm$^2$ according to Example 8. The initial discharge capacity is 228.9 $\mu$Ah/cm$^2 \cdot \mu$m, which is higher as compared to Example 3. In addition, after 50 cycles, the thin film shows a capacity retention of 93.4%, which suggests that the thin film is most stable.

Figure 3D:
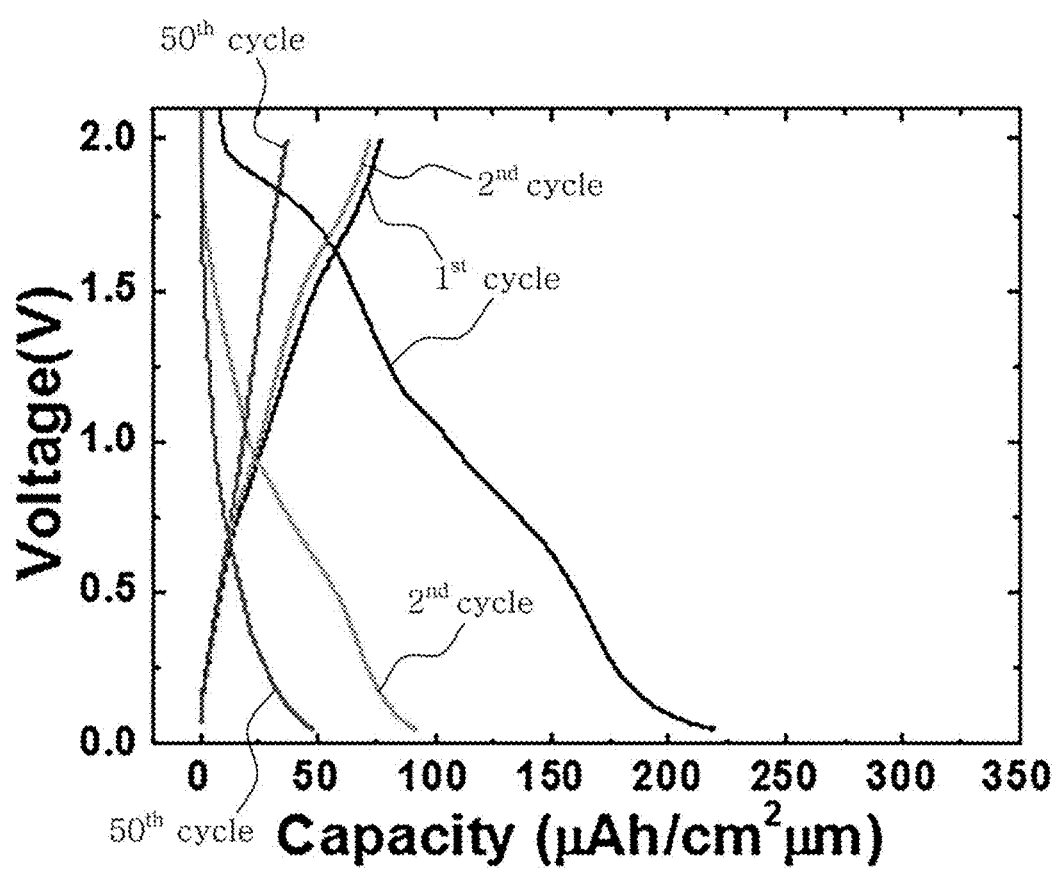
FIG. 3D is a graph illustrating the charge/discharge test result of a $SiN_x$ thin film deposited with a deposition power of 0.5 W/cm² as a transparent anode thin film according to an embodiment of the present disclosure.

FIG. 3D illustrates the of the $SiN_x$ thin film deposited with a power of 0.5 W/cm$^2$ according to Example 7. The graph has a shape similar to the shape of a graph of a thin film using a high ratio of nitrogen. The thin film shows the lowest capacity and no plateau is observed. Therefore, it can be seen that the optimized deposition condition of a $SiN_x$ thin film includes a deposition power of 0.75 W/cm$^2$, working pressure of 5 mTorr and 0.3% $N_2$/Ar atmosphere.

Test Example 4

Determination of Composition of Transparent Anode Thin Film

To determine the composition of the $SiN_x$ thin film obtained under the above optimized condition, analysis was carried out through X-ray photoelectron spectroscopy (XPS).

Figure 4A:
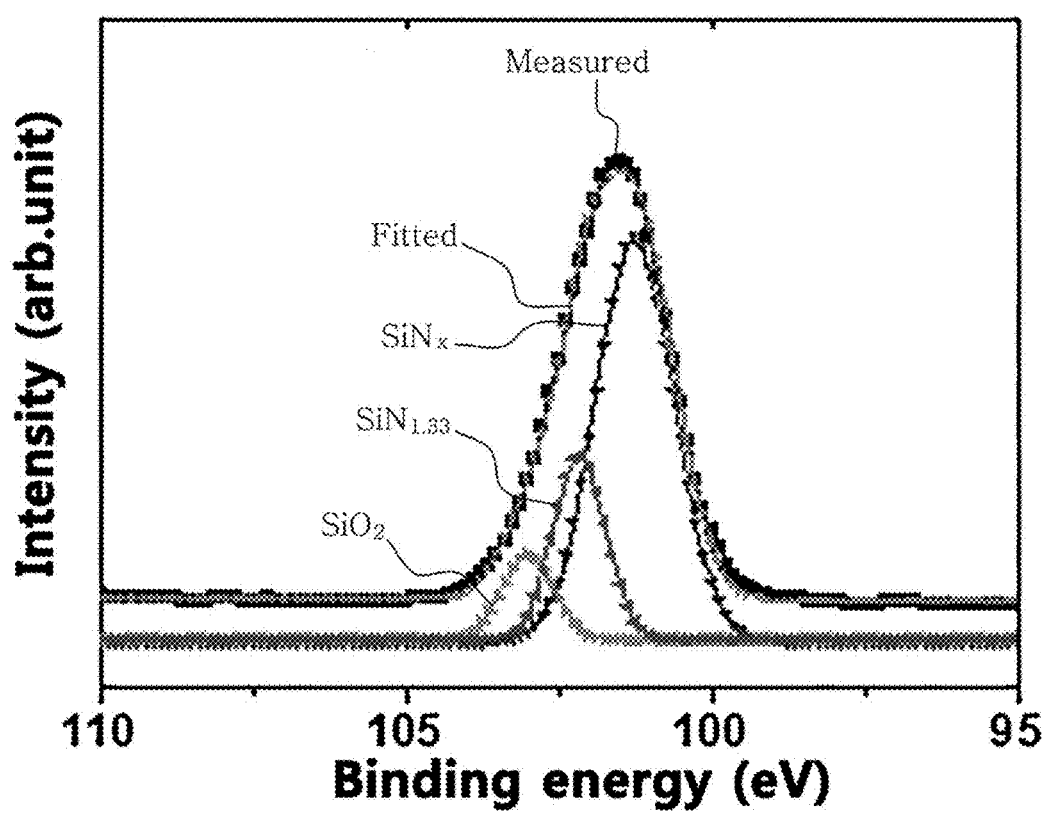
FIGS. 4A and 4B are graph illustrating the analysis results of X-ray photoelectron spectroscopy (XPS) of the transparent anode thin film according to an embodiment of the present disclosure.
Figure 4B:
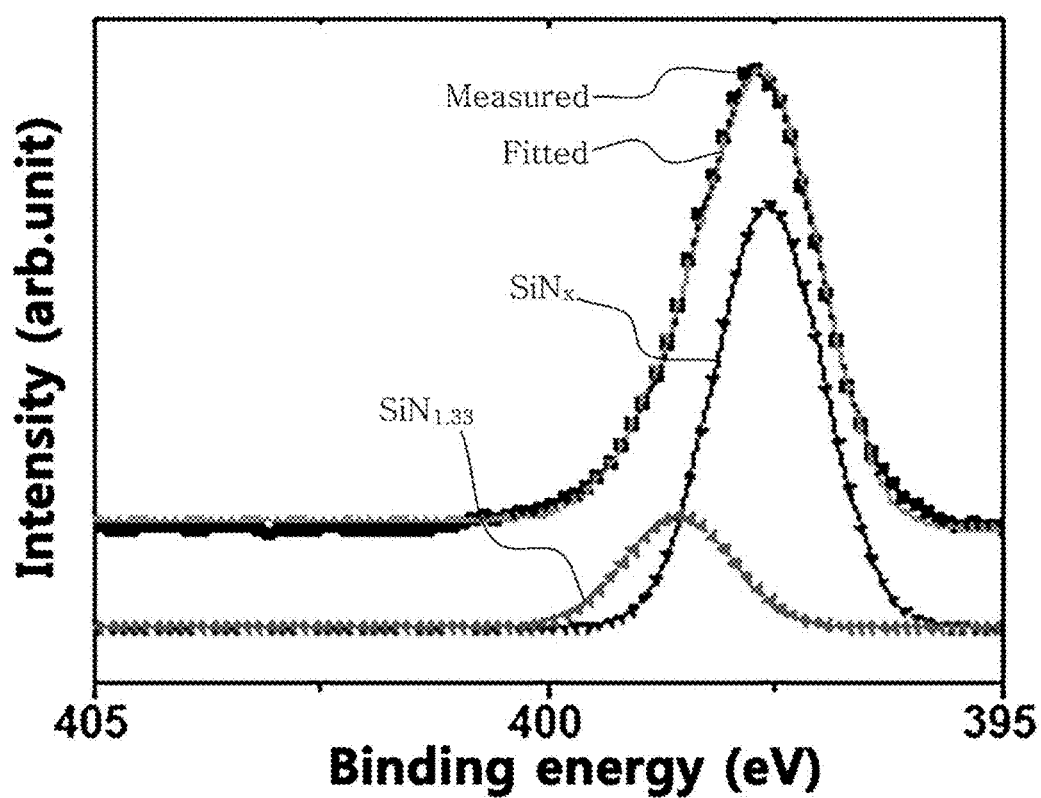

FIG. 4 illustrates binding energy of Si with N and intensity. After fitting the graph with a simulation program, the ratio of Si to N was obtained. It can be seen that the thus determined composition is $SiN_{0.85}$.

Test Example 5

Determination of Cycle Life

Figure 5:
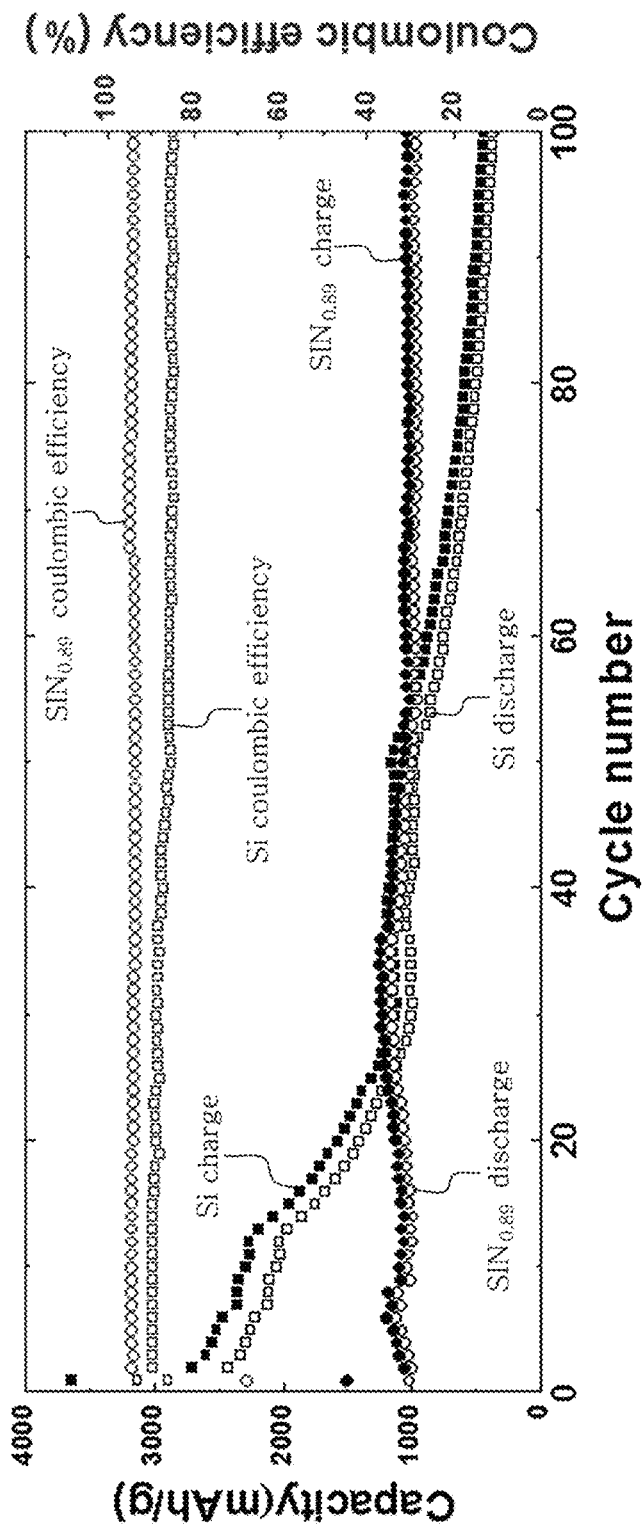
FIG. 5 illustrates the result of cycle life of the transparent anode thin film ($SiN_{0.85}$ thin film) according to an embodiment of the present disclosure.

FIG. 5 illustrates the cycle life test result of the $SiN_{0.85}$ thin film (Example 8) as compared to the Si thin film (Example 1). The test was carried out for 100 cycles. In the case of the Si thin film, the discharge capacity is reduced by about 68% after 30 cycles, is stabilized from the 30$^{th}$ cycle to the 50$^{th}$ cycle, and then is rapidly reduced from the 50$^{th}$ cycle. After 100 cycles, the Si thin film shows a discharge capacity corresponding to 12% of the initial discharge capacity. The Si thin film retains a coulombic efficiency of 85-86%. Such a decrease in capacity of the Si thin film mainly results from the exfoliation of the thin film caused by volumetric swelling. The $SiN_{0.85}$ thin film retains 95% of the initial discharge capacity even after 100 cycles. Thus, the $SiN_{0.85}$ thin film retains a coulombic efficiency of 94% or more.

Test Example 6

Determination of Transmittance

Figure 6:
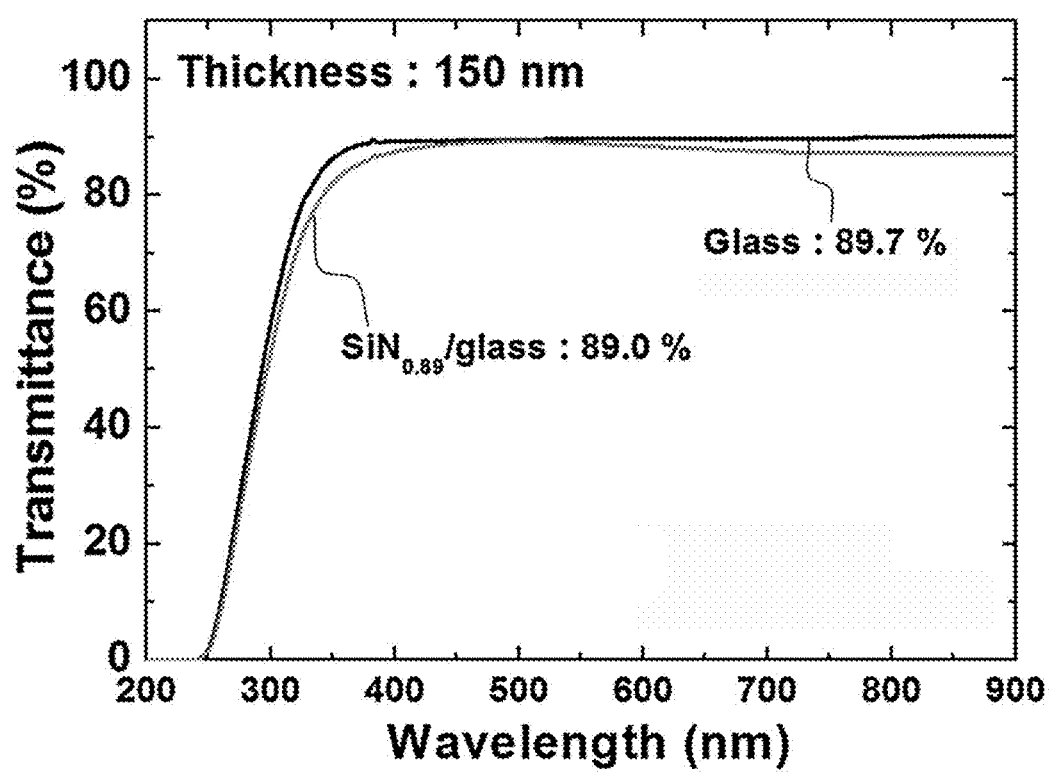
FIG. 6 illustrates the result of transmittance of the transparent anode thin film ($SiN_{0.85}$ thin film) according to an embodiment of the present disclosure.

FIG. 6 illustrates the transmittance of the $SiN_{0.85}$ thin film according to Example 8. A glass substrate was used to determine the transmittance. It can be seen that the thin film has a significantly high transmittance of 89% including the substrate at a wavelength of 550 nm.

As can be seen from the foregoing, the transparent anode thin film according to an embodiment of the present disclosure uses a Si-based anode active material having a specific composition to provide a higher cycle life as compared to the conventional thin film including Si. In addition, the transparent anode thin film provides a higher discharge capacity than the discharge capacity of an anode material using a carbonaceous material. Further, it is possible to realize a transparent battery, when using the transparent anode thin film having a high transmittance as an anode material for a transparent thin film secondary battery.

It should be understood that the above-described embodiments are given by way of illustration only and the scope of the present disclosure is not limited to the above detailed description. The scope of the present disclosure is defined only by the following claims, and various changes and modifications may be made within the scope of the present disclosure. Therefore, such changes and modifications will become apparent to those skilled in the art and fall within the scope of the present disclosure.

What is claimed is:

1. A transparent anode thin film comprising a transparent anode active material layer,
   wherein the transparent anode active material layer comprises a Si-based anode active material having a composition represented by the following [Chemical Formula 1]:

$$SiN_x \qquad \text{[Chemical Formula 1]}$$

(wherein $0<x\leq1.5$), and
   wherein the transparent anode thin film has a transmittance of 80% or greater in a wavelength region of 550 nm.

2. The transparent anode thin film according to claim 1, wherein $0<x\leq1.0$.

3. The transparent anode thin film according to claim 1, wherein $0.6\leq x\leq0.9$.

4. The transparent anode thin film according to claim 1, wherein the transparent anode active material layer has a thickness of 0.1-2 μm.

5. The transparent anode thin film according to claim 1, which has a transmittance of 85% or greater in a wavelength region of 550 nm.

6. A lithium thin film secondary battery comprising the transparent anode thin film as defined in claim 1.

7. A method for manufacturing a transparent anode thin film comprising carrying out deposition of a transparent anode active material layer,
   wherein the transparent anode active material layer comprises a Si-based anode active material having a composition represented by the following [Chemical Formula 1]:

$$SiN_x \qquad \text{[Chemical Formula 1]}$$

(wherein $0<x\leq1.5$).

8. The method for manufacturing a transparent anode thin film according to claim 7, wherein the deposition comprises deposition of a Si target under gaseous atmosphere.

9. The method for manufacturing a transparent anode thin film according to claim 8, wherein the gaseous atmosphere comprises at least one of Ar and $N_2$.

10. The method for manufacturing a transparent anode thin film according to claim 8, wherein the gaseous atmosphere is $N_2$/Ar atmosphere which has a ratio of $N_2$/Ar of 0.1-0.5%.

11. The method for manufacturing a transparent anode thin film according to claim 7, wherein the deposition is carried out by at least one selected from sputtering, pulse laser deposition (PLD) and plasma-enhanced chemical vapor deposition (PECVD).

12. The method for manufacturing a transparent anode thin film according to claim 7, wherein the deposition is carried out under a pressure of 1-30 mtorr.

13. The method for manufacturing a transparent anode thin film according to claim 7, wherein the deposition is carried out under a pressure of 1-10 mtorr.

14. The method for manufacturing a transparent anode thin film according to claim 7, wherein the deposition is carried out with a deposition power of 0.1-2.0 W/cm$^2$.

* * * * *